US012278402B2

(12) United States Patent
Chen et al.

(10) Patent No.: US 12,278,402 B2
(45) Date of Patent: Apr. 15, 2025

(54) TOP COVER ASSEMBLY INCLUDING FIXING ELEMENT FOR FIXING SEALING ELEMENT TO MOUNTING PART AND BATTERY INCLUDING THE SAME

(71) Applicant: Jiangsu Contemporary Amperex Technology Limited, Jiangsu (CN)

(72) Inventors: Xinxiang Chen, Jiangsu (CN); Shoujun Huang, Jiangsu (CN); Peng Wang, Jiangsu (CN); Yulian Zheng, Jiangsu (CN); Huasheng Su, Jiangsu (CN)

(73) Assignee: Jiangsu Contemporary Amperex Technology Limited, Jiangsu (CN)

( * ) Notice: Subject to any disclaimer, the term of this patent is extended or adjusted under 35 U.S.C. 154(b) by 588 days.

(21) Appl. No.: 17/624,520

(22) PCT Filed: Sep. 28, 2020

(86) PCT No.: PCT/CN2020/118376
§ 371 (c)(1),
(2) Date: Jan. 3, 2022

(87) PCT Pub. No.: WO2021/238002
PCT Pub. Date: Dec. 2, 2021

(65) Prior Publication Data
US 2022/0247053 A1 Aug. 4, 2022

(30) Foreign Application Priority Data
May 29, 2020 (CN) .......................... 202010473006.6

(51) Int. Cl.
*H01M 50/636* (2021.01)
*H01M 50/15* (2021.01)
*H01M 50/186* (2021.01)

(52) U.S. Cl.
CPC ......... *H01M 50/636* (2021.01); *H01M 50/15* (2021.01); *H01M 50/186* (2021.01)

(58) Field of Classification Search
CPC ... H01M 50/636; H01M 50/186; H01M 50/15
(Continued)

(56) References Cited

U.S. PATENT DOCUMENTS

2012/0251850 A1   10/2012  Yamamoto et al.
2014/0065451 A1   3/2014   Fuhr et al.

FOREIGN PATENT DOCUMENTS

CN    101640257 A    2/2010
CN    202797106 U    3/2013
(Continued)

OTHER PUBLICATIONS

Notice Reasons for Refusal issued by JPO for Japanese Patent Application No. 2022-528988, mailed Jun. 20, 2024, 7 Pages.

*Primary Examiner* — Sean P Cullen
(74) *Attorney, Agent, or Firm* — STERNE, KESSLER, GOLDSTEIN & FOX P.L.L.C.

(57) ABSTRACT

The present disclosure provides a top cover assembly for a battery, a battery and a device using a battery as a power source. The top cover assembly includes: a cover plate body having a liquid injection hole; a mounting part configured to be connected with the cover plate body and arranged around the liquid injection hole; a sealing element configured to be connected with the mounting part, wherein the sealing element includes a first top wall and a first side wall connected to the periphery of the first top wall, the first top wall is configured to cover the liquid injection hole, and the first side wall is configured to be in press fit with the mounting part to achieve sealing of the liquid injection hole;

(Continued)

and a fixing element configured to be connected with the cover plate body and to fix the sealing element to the mounting part.

11 Claims, 7 Drawing Sheets

(58) Field of Classification Search
USPC .................................................. 429/175, 185
See application file for complete search history.

(56) References Cited

FOREIGN PATENT DOCUMENTS

| | | | | |
|---|---|---|---|---|
| CN | 204271180 U | | 4/2015 | |
| CN | 104737330 A | | 6/2015 | |
| CN | 205069696 U | * | 3/2016 | |
| CN | 208256801 U | | 12/2018 | |
| CN | 208336404 U | | 1/2019 | |
| CN | 110021728 A | * | 7/2019 | ............ H01M 10/04 |
| CN | 209169284 U | | 7/2019 | |
| CN | 111384357 A | | 7/2020 | |
| EP | 4030553 A1 | | 7/2022 | |
| JP | S50144224 U | | 11/1975 | |
| JP | 09007558 A | * | 1/1997 | |
| JP | 2006324244 A | | 11/2006 | |
| JP | 2009048970 A | * | 3/2009 | |
| JP | 2013-171693 A | | 9/2013 | |
| JP | 2014212142 A | * | 11/2014 | |
| JP | 2019-145376 A | | 8/2019 | |

* cited by examiner

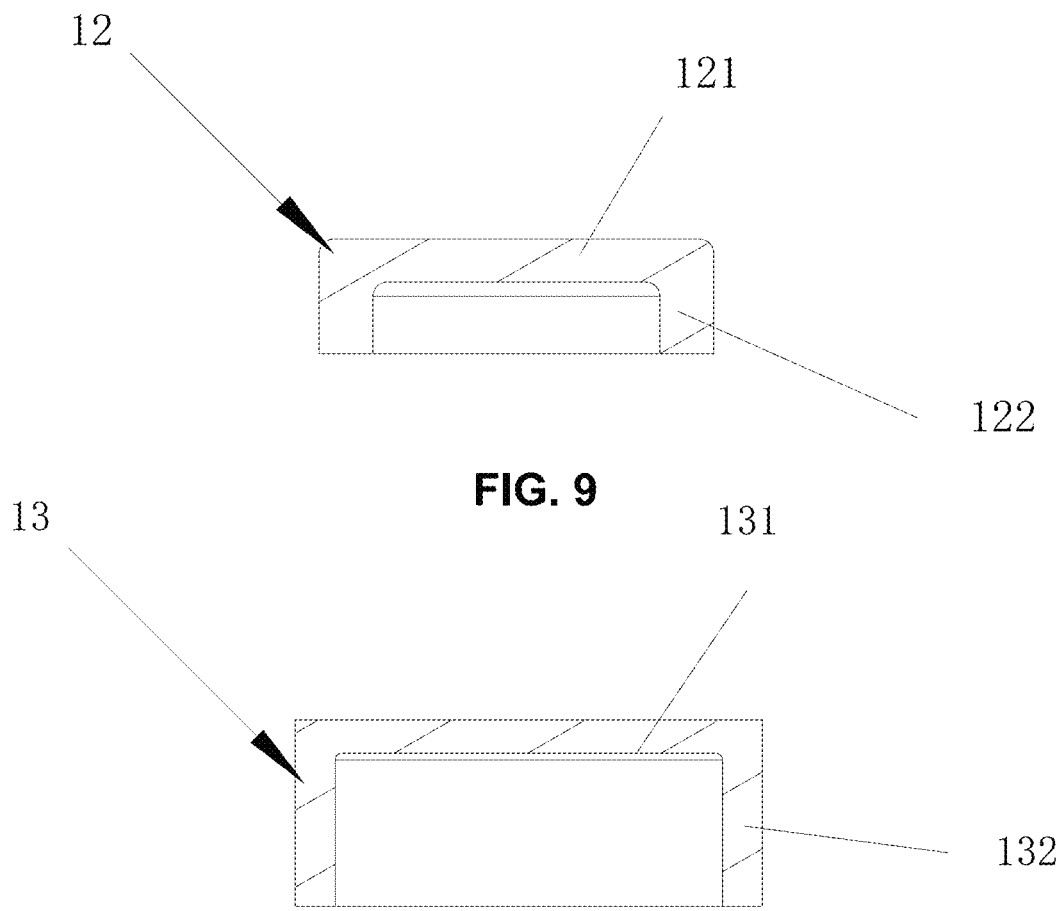
FIG. 9
FIG. 10
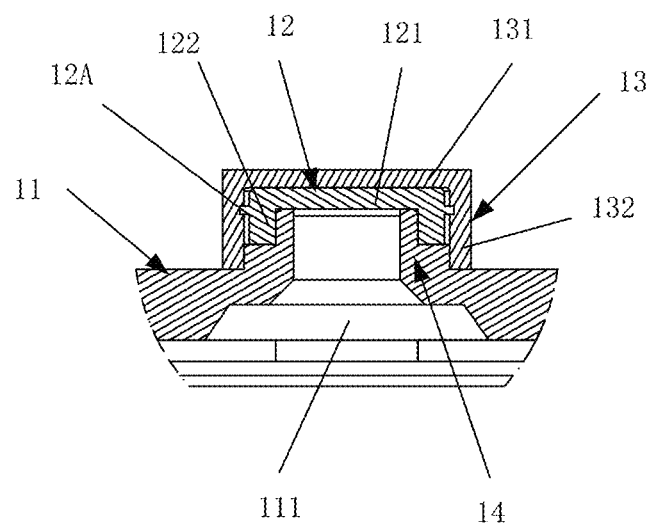
FIG. 11

TOP COVER ASSEMBLY INCLUDING FIXING ELEMENT FOR FIXING SEALING ELEMENT TO MOUNTING PART AND BATTERY INCLUDING THE SAME

CROSS REFERENCE OF RELATED APPLICATIONS

This application is a National Stage of International Application No. PCT/CN2020/118376 filed on Sep. 28, 2020, which claims the priority of the Chinese patent application No. 202010473006.6, entitled "TOP COVER ASSEMBLY FOR BATTERY, BATTERY AND DEVICE USING BATTERY AS POWER SOURCE" and filed on May 29, 2020, both of which are incorporated herein by reference in their entireties.

FIELD OF THE INVENTION

The present disclosure relates to the technical field of battery devices, in particular to a top cover assembly for a battery, a battery and a device using a battery as a power source.

BACKGROUND OF THE INVENTION

Lithium-ion batteries have high requirements on the sealing of structures, and no electrolyte can seep out during use, otherwise the surrounding air and environment will be polluted, and no water vapor can enter the interior of the battery, since if water vapor reacts with the electrolyte, the service life of the battery assembly of a battery will be reduced.

The initial filling of the electrolyte of the battery is usually performed in the production stage, and after finishing the filling of electrolyte, the liquid injection hole needs to be sealed to ensure the sealing of the battery. If the battery needs to be refilled after use, the sealing structure of the liquid injection hole can be opened to finish refilling, and then the liquid injection hole is resealed after refilling.

At present, the battery liquid injection hole generally is sealed by a T-shaped sealing nail as a sealing element, and a columnar part of the sealing nail is inserted into the liquid injection hole, a nail head of the sealing nail is located outside the cover plate body, and then a metal cover is welded on the outside of the nail head to achieve resealing.

SUMMARY OF THE INVENTION

The purpose of the present disclosure is to provide a top cover assembly for a battery, a battery and a device using a battery as a power source.

A first aspect of the present disclosure provides a top cover assembly of a battery, including:
  a cover plate body having a liquid injection hole;
  a mounting part configured to be connected with the cover plate body and arranged around the liquid injection hole;
  a sealing element configured to be connected with the mounting part, wherein the sealing element includes a first top wall and a first side wall connected to the periphery of the first top wall, the first top wall is configured to cover the liquid injection hole, and the first side wall is configured to be in press fit with the mounting part to achieve sealing of the liquid injection hole; and
  a fixing element configured to be connected with the cover plate body and to fix the sealing element to the mounting part.

In some embodiments, an anti-release part is arranged between the inner peripheral surface of the first side wall and the outer peripheral surface of the mounting part, and the anti-release part is configured to prevent the sealing element from separating from the mounting part.

In some embodiments, the anti-release part includes a bump or a rough area, the bump or the rough area is arranged on at least one of the inner peripheral surface of the first side wall and the outer peripheral surface of the mounting part.

In some embodiments, the top cover assembly further includes a first connecting part, and the first connecting part is configured to connect the first side wall and the mounting part.

In some embodiments, the first connecting part includes:
  a first connecting convex part, arranged in one of the first side wall and the mounting part; and
  a first connecting concave part, arranged in the other of the first side wall and the mounting part;
  wherein the first connecting convex part is configured to be connected with the first connecting concave part.

In some embodiments, the first top wall is in press fit with the mounting part, to achieve sealed connection between the sealing element and the mounting part.

In some embodiments, the first top wall is provided with a sealing ring protruding towards the mounting part, and the sealing ring is configured to be in press fit with the mounting part.

In some embodiments, the outer peripheral surface of the mounting part is provided with a recessed part which is inwardly recessed, and the recessed part is configured to accommodate part of the first side wall.

In some embodiments, the cover plate body is provided with a groove, the groove is configured to accommodate at least part of the sealing element, and the mounting part is connected to the bottom wall of the groove.

In some embodiments, the fixing element includes a second top wall and a second side wall connected to the outer periphery of the second top wall, wherein
  the second top wall is in press fit with the first top wall to fix the sealing element; and/or,
  the second side wall is in press fit with the first side wall to fix the sealing element.

In some embodiments, a gap is formed between at least part of the first side wall and at least part of the second side wall.

In some embodiments, the top cover assembly further includes a second connecting part, the second connecting part is configured to connect the first side wall and the second side wall, and the second connecting part includes:
  a second connecting convex part, arranged in one of the first side wall and the second side wall; and
  a second connecting concave part, arranged in the other of the first side wall and the second side wall;
  wherein the second connecting convex part is configured to be connected with the second connecting concave part.

A second aspect of the present disclosure provides a battery, including:
  the top cover assembly of the first aspect of the present disclosure;
  a housing configured to be connected with the top cover assembly and form an accommodating cavity; and
  an electrode assembly, arranged in the accommodating cavity.

A third aspect of the present disclosure provides a device using a battery as a power source, including the battery of the second aspect of the present disclosure, and the battery is used for providing electric energy.

Based on the top cover assembly provided in the embodiments of the present disclosure, a first top wall of the sealing element covers a liquid injection hole and the inner peripheral surface of a first side wall of the sealing element is in press fit with the outer peripheral surface of the mounting part, to achieve sealing of the liquid injection hole by the sealing element. Since no sealing part is arranged in the liquid injection hole and the mounting part, the internal space of the battery is increased. Since the internal space of the battery is relatively increased, the battery using the top cover assembly can have at least one of the following advantages: it is beneficial to increasing the energy density of the battery; more space can be formed to store gas generated when the battery is used, such that more gas can be accommodated inside the housing of the battery, which is beneficial to reducing the lithium precipitation phenomenon of the battery; it is beneficial to reducing the force subjected to the explosion-proof valve of the battery by the gas generated inside the housing, and it is beneficial to prolonging the service life of the explosion-proof valve.

Other features and advantages of the present disclosure will become clear through the following detailed description of exemplary embodiments of the present disclosure with reference to the accompanying drawings.

BRIEF DESCRIPTION OF THE DRAWINGS

The drawings described herein are used to provide further understanding of the present disclosure and constitute a part of the present application. The exemplary embodiments of the present disclosure and their descriptions are used to explain the present disclosure, rather than constituting an improper limitation of the present disclosure. In the accompanying drawings:

FIG. 9 is a structural schematic diagram of a sectional view of a sealing element of a top cover assembly in the embodiment shown in FIG. 6.

FIG. 10 is a structural schematic diagram of a sectional view of a fixing element of a top cover assembly in the embodiment of the embodiment shown in FIG. 6.

FIG. 11 is a structural schematic diagram of a partial sectional view of a top cover assembly in another embodiment in the liquid injection hole.

DETAILED DESCRIPTION OF THE EMBODIMENTS

Figure 1:
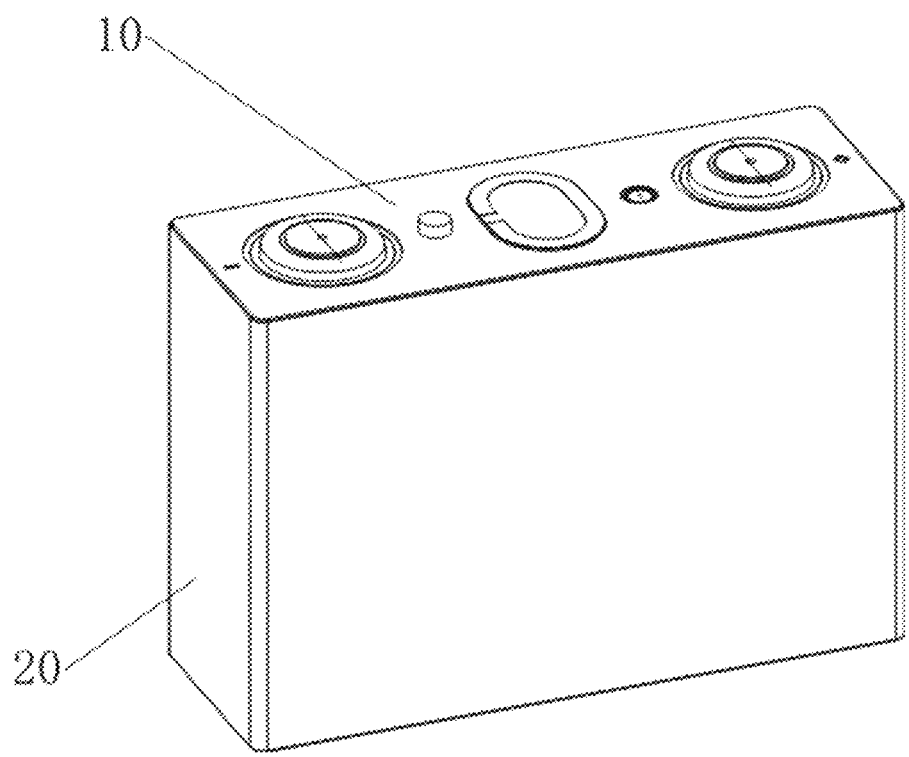
FIG. 1 is a structural schematic diagram of a battery in some embodiments of the present application.

A clear and complete description will be given below on the technical solutions in the embodiments of the present disclosure in combination with accompanying drawings in the embodiments of the present disclosure, and apparently the embodiments described below are only a part but not all of the embodiments of the present disclosure. The description of at least one exemplary embodiment below is actually merely illustrative, rather than serving as any limitation to the present disclosure and its applications or uses. Based upon the embodiments of the present disclosure, all the other embodiments which can occur to those skilled in the art without any creative effort shall all fall within the protection scope of the present disclosure.

Unless otherwise specifically stated, the relative arrangement of components and steps, numerical expressions and numerical values set forth in these embodiments do not limit the scope of the present disclosure. At the same time, it should be understood that, for ease of description, the sizes of the various parts shown in the drawings are not drawn in accordance with actual proportional relationships. The technologies, methods, and equipment known to those of ordinary skills in the relevant fields may not be discussed in detail, but where appropriate, the technologies, methods, and equipment should be regarded as part of the authorization specification. In all the examples shown and discussed herein, any specific value should be interpreted as merely exemplary, rather than as a limitation. Therefore, other examples of the exemplary embodiment may have different values. It should be noted that similar reference numerals and letters indicate similar items in the following drawings, so once an item is defined in one drawing, it does not need to be further discussed in the subsequent drawings.

In the description of the present disclosure, it should be understood that, the use of such words as "first" and "second" to define parts is merely to facilitate distinguishment of corresponding parts, unless otherwise stated, the above words have no special meanings, and should not be understood as a limitation to the protection scope of the present disclosure.

In the description of the present disclosure, it should be understood that, the orientation or positional relationship indicated by such terms as "front, rear, up, down, left, right", "lateral, longitudinal, vertical, horizontal", and "top, bottom" is generally based on orientation or positional relationship shown in the accompanying drawings. Such terms are merely for the convenience of description of the present disclosure and simplified description, rather than indicating or implying that the device or element referred to must be located in a certain orientation or must be constructed or operated in a certain orientation without a statement to the contrary, therefore, the terms cannot be understood as a limitation to the protection scope of the present disclosure; and such orientation terms as "inner, outside" mean inner or outside relative to the contour of each part itself.

In the process of finding the present application, the inventor found that in the aforementioned related technologies that use sealing nails to seal the liquid injection hole, since the columnar part of the sealing nail is inserted into a liquid injection hole, the columnar part extending into the liquid injection hole seals the liquid injection hole based on its own expansion. A guiding oblique angle on the columnar part is further required during assembly, the height occupied by the guiding oblique angle is an invalid sealing size and occupies the space in the height direction, moreover, the columnar part of the sealing nail extends into the liquid injection hole, resulting in that the space for producing gas inside the battery is small.

For this reason, embodiments of the present disclosure provide a top cover assembly for a battery, a battery and a device using a battery as a power source.

The device using a battery as a power source in the embodiments of the present disclosure includes a battery for providing electric energy. The device may be for example a vehicle, a ship, an energy storage device and the like.

Figure 2:
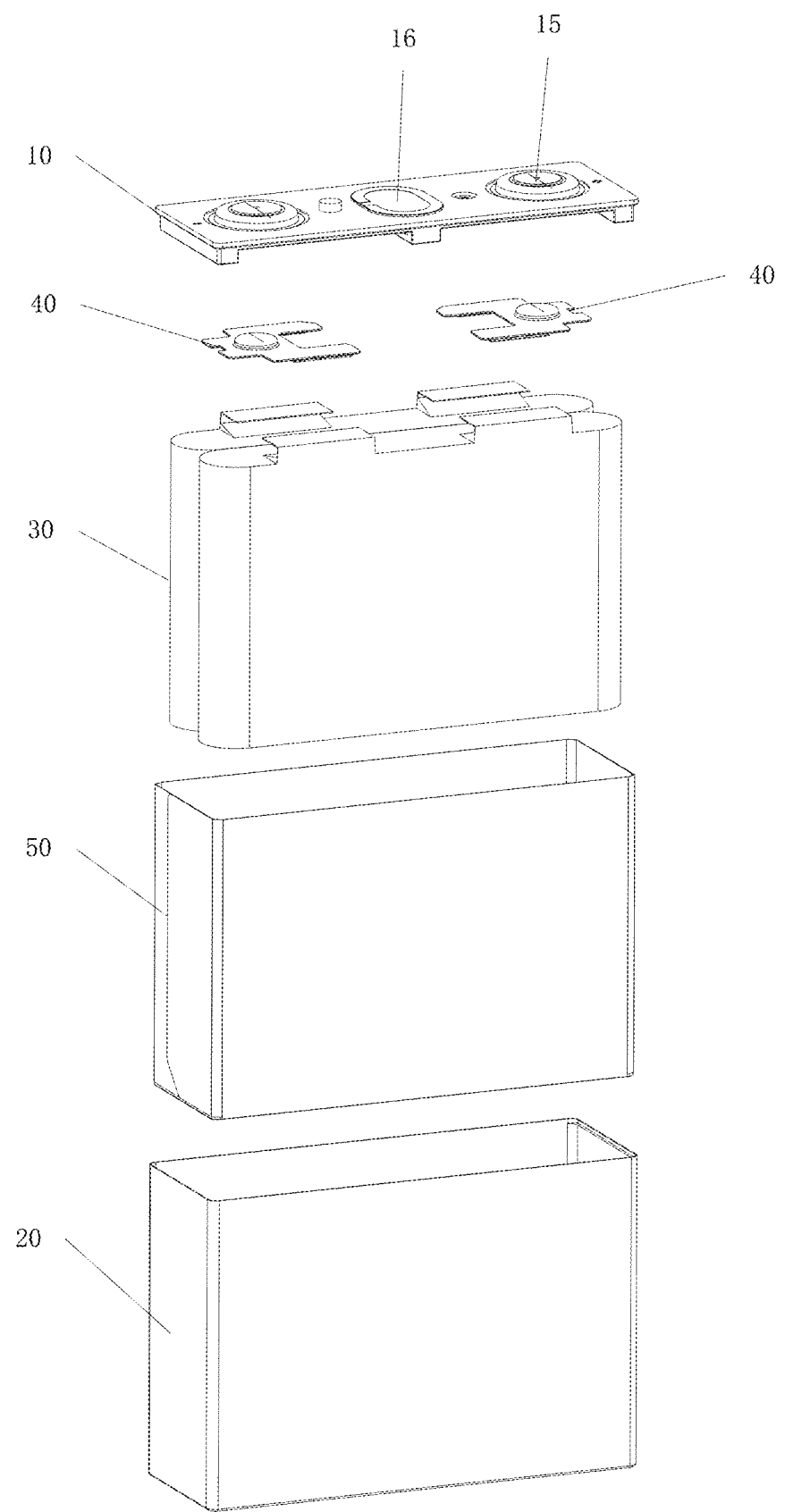
FIG. 2 is an exploded view of a battery in some embodiments of the present application.

As shown in FIG. 1 and FIG. 2, the battery of the embodiments of the present disclosure mainly includes a top cover assembly 10, a housing 20 and an electrode assembly 30. The housing 20 is configured to be connected with the top cover assembly 10 and form an accommodating cavity. The electrode assembly 30 is arranged in the accommodating cavity.

As shown in FIG. 1 and FIG. 2, the battery further includes an adapter sheet 40 and an insulating sheet 50. The top cover assembly 10 includes a pole column 15. The electrode assembly 30 is electrically connected to the pole column 15 of the top cover assembly 10 through the adapter sheet 40. The insulating sheet 50 is arranged in the accommodating cavity of the battery and is located between the electrode assembly 30 and the housing 20 for insulating and protecting the electrode assembly 30.

Figure 3:
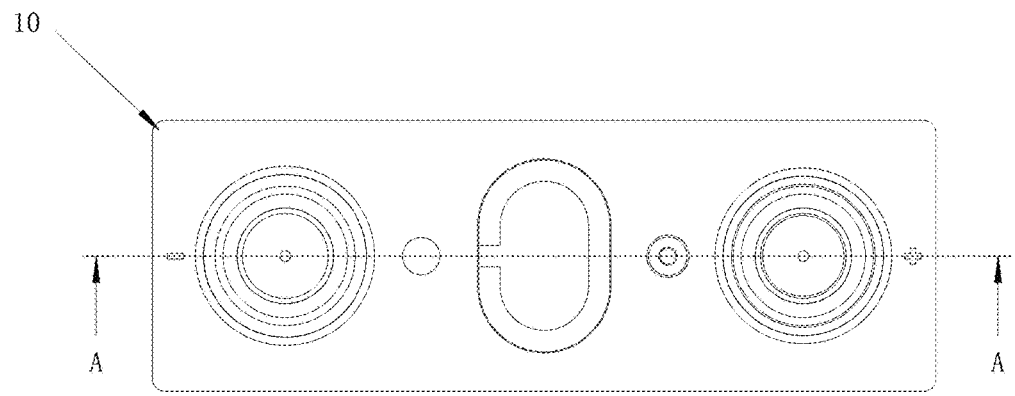
FIG. 3 is a structural schematic diagram of a top view of a top cover assembly of a battery in some embodiments of the present application.
Figure 4:
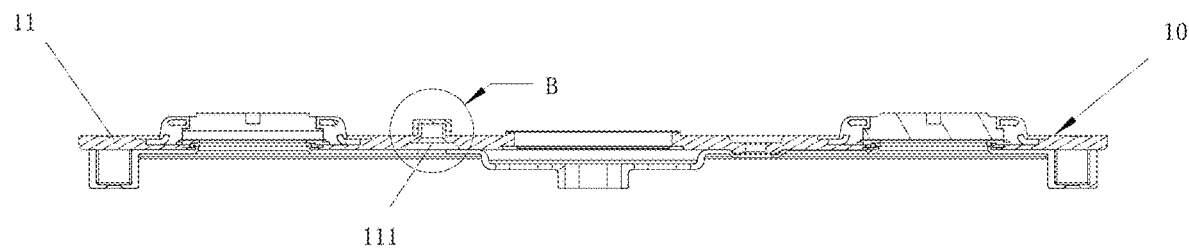
FIG. 4 is a structural schematic diagram of a sectional view in the A-A direction of the embodiment shown in FIG. 3.

As shown in FIG. 2 to FIG. 4, the top cover assembly 10 includes a cover plate body 11, a liquid injection hole sealing structure, a pole column 15 and an explosion-proof valve 16. The liquid injection hole sealing structure is configured to seal the liquid injection hole 111 on the sealing cover plate body 11.

In some embodiments, the liquid injection hole sealing structure includes a mounting part 14 and a sealing element 12; in some embodiments, the liquid injection hole sealing structure includes a mounting part 14, a sealing element 12 and a fixing element 13.

As shown in FIG. 2 to FIG. 15, the top cover assembly 10 of the battery in the embodiment of the present disclosure mainly includes a cover plate body 11, a mounting part 14 and a sealing element 12.

The cover plate body 11 is provided with a liquid injection hole 111. The mounting part 14 is configured to be connected with the cover plate body 11, and is arranged to surround the liquid injection hole 111. The sealing element 12 is configured to be connected with the mounting part 14. The sealing element 12 includes a first top wall 121 and a first side wall 122 connected to the periphery of the first top wall 121. The first top wall 121 is configured to cover the liquid injection hole 111, and the first side wall 122 is configured to be in press fit with the mounting part 14, to achieve sealing of the liquid injection hole 111.

Based on the top cover assembly 10 provided in the embodiments of the present disclosure, a first top wall 121 of the sealing element 12 covers a liquid injection hole 111 and the inner peripheral surface of a first side wall 122 of the sealing element 12 is in press fit with the outer peripheral surface of the mounting part 14, to achieve sealing of the liquid injection hole 111 by the sealing element 12. Since no sealing part is arranged in the liquid injection hole 111 and the mounting part 14, compared with the related technology in which a sealing nail is adopted to seal the liquid injection hole, the internal space of the battery is increased. Since the internal space of the battery is relatively increased, the battery using the top cover assembly 10 can have at least one of the following advantages: it is beneficial to increasing the energy density of the battery; more space can be formed to store gas generated when the battery is used, such that more gas can be accommodated inside the housing of the battery, which is beneficial to reducing the lithium precipitation phenomenon of the battery; it is beneficial to reducing the force subjected to the explosion-proof valve 16 of the battery by the gas generated inside the housing, and it is beneficial to prolonging the service life of the explosion-proof valve 16.

In some embodiments, an anti-release part is arranged between the inner peripheral surface of the first side wall 122 and the outer peripheral surface of the mounting part 14, and the anti-release part is configured to prevent the sealing element 12 from separating from the mounting part 14.

In some embodiments the anti-release part includes a bump 141, and the bump 141 is arranged in at least one of the inner peripheral surface of the first side wall 122 and the outer peripheral surface of the mounting part 14.

In some other embodiments, the anti-release part may include a rouge area arranged on at least one of the inner peripheral surface of the first side wall 122 and the outer peripheral surface of the mounting part 14.

The frictional force between the inner peripheral surface of the first side wall 122 and the outer peripheral surface of the mounting part 14 can be increased through the rough area or the bump 141 to increase the adhesion force between the sealing element 12 and the mounting part 14, therefore it is beneficial to preventing the sealing element 12 from separating from the mounting part 14 and is beneficial to ensuring the sealing effect on the liquid injection hole 111.

In some embodiments, the top cover assembly 10 further includes a first connecting part. The first connecting part is configured to connect the first side wall 122 and the mounting part 14. The setting of the first connecting part can increase firmness of connection between the sealing element 12 and the mounting part 14, which is beneficial to preventing the sealing element 12 from separating from the mounting part 14, and further beneficial to ensuring sealing effect on the liquid injection hole 111.

In some embodiments, the first connecting part includes a first connecting convex part and a first connecting concave part. The first connecting convex part is arranged in one of the first side wall 122 and the mounting part 14. The first connecting convex part is arranged in the other of the first side wall 122 and the mounting part 14. Wherein the first connecting convex part is configured to be connected with the first connecting concave part.

Wherein the shape of the first connecting convex part is preferably matched with the shape of the first connecting concave part.

For example, the first connecting convex part may be a first convex ring arranged on one of the first side wall 122 or the mounting part 14, and the first connecting concave part may include a first convex ring which is shape-matched with the first convex ring and arranged on the other of the first side wall 122 or the mounting part 14. Wherein the number of the first convex ring may be one or more, and the number of the first concave ring is the same as the number of the first convex ring.

For another example, the first connecting convex part may include a first protruding block arranged on one of the first side wall 122 or the mounting part 14, and the second connecting concave part may include a first notch or a first opening which is shape-matched with the first protruding block and arranged on the other of the first side wall 122 or the mounting part 14. Wherein the number of the first protruding block may be one or more, and the number of the first notch or the first opening is the same as the number of first protruding block.

In some embodiments, the first top wall 121 of the sealing element 12 is in press fit with the mounting part 14, to achieve sealed connection between the sealing element 12 and the mounting part 14.

Through press fit between the first side wall 122 of the sealing element 12 and the mounting part 14 and through press fit between the first top wall 121 of the sealing element 12 and the mounting part 14, the sealing of the sealing element 12 on the liquid injection hole 111 is achieved, and further the sealing performance of the sealing element 12 on the liquid injection hole 111 is enhanced.

In some embodiments, the first top wall 121 of the sealing element 12 is provided with a sealing ring 12B protruding towards the mounting part 14, and the sealing ring 12B is in press fit with the mounting part 14.

The sealing ring 12B is more likely to achieve full circumferential contact with the mounting part 14 in the circumferential direction relative to the remaining parts of the first top wall 121, thereby being beneficial to improving sealing performance between the first top wall 121 of the sealing element 12 and the mounting part 14.

In some embodiments, the outer peripheral surface of the mounting part 14 is provided with a recessed part 14D which is inwardly recessed, and the recessed part 14D is configured to accommodate part of the first side wall 122 of the sealing element 12. The setting is beneficial to firm fixation between the sealing element 12 and the mounting part 14, is beneficial to preventing the sealing element 12 from being separated from the mounting part 14, and is further beneficial to ensuring the sealing effect on the liquid injection hole 111.

In some embodiments, the cover plate body 11 is provided with a groove, the groove is configured to accommodate at least part of the sealing element 12, and the mounting part 14 is connected to the bottom wall of the groove.

A groove is arranged on the cover plate body 11, and the mounting part 14 is arranged in the groove, which is beneficial to reducing the space above the top surface of the cover plate body 11 occupied by the mounting part 14 and the sealing element 12, and is also beneficial to preventing external forces from affecting the firmness of connection between the sealing element 12 and the mounting part 14, and is beneficial to preventing the sealing element 12 from being separated from the mounting part 14, and is further beneficial to ensuring the sealing effect on the liquid injection hole 111.

In some embodiments, the top cover assembly 10 further includes a fixing element 13, the fixing element 13 is configured to be connected with the cover plate body 11 and fix the sealing element 12 to the mounting part 14.

When the fixing element 13 is arranged, the firmness of the connection between the sealing element 12 and the mounting part 14 can be increased through the fixing element 13, which is beneficial to preventing the sealing element 12 from being separated from the mounting part 14, and is further beneficial to ensuring the sealing effect on the liquid injection hole 111.

In some embodiments, the fixing element 13 includes a second top wall 131 and a second side wall 132 connected to the outer periphery of the second top wall 131, wherein the second top wall 131 is in press fit with the first top wall 121 to fix the sealing element 12; and/or, the second side wall 132 is in press fit with the first side wall 122 to fix the sealing element 12.

The second top wall 131 of the fixing element 13 and the first top wall 121 of the sealing element 12 are in press fit and the second side wall 132 of the fixing element 13 and the first side wall 122 of the sealing element 12 are in press fit, which is beneficial to increasing the contact pressure between the sealing element 12 and the mounting part 14, and further being beneficial to improving the sealing effect of the sealing element 12 on the liquid injection hole 111.

In some embodiments, a gap G is formed between at least part of the first side wall 122 of the sealing element 12 and at least part of the second side wall 132 of the fixing element 13. A gap G is formed between at least part of the first side wall 122 of the sealing element 12 and at least part of the second side wall 132 of the fixing element 13, which is beneficial to the fixing element 13 to reach the assembly position smoothly during assembly, such that the second top wall 131 of the fixing element 13 can be effectively in press fit with the first top wall 121 of the sealing element 12, thereby being beneficial to increasing the contact pressure between the first top wall 121 and the mounting part 14, and is further beneficial to improving the sealing effect of the first top wall 121 of the sealing element 12 on the liquid injection hole 111. In addition, it is beneficial to preventing the second side wall 132 of the fixing element 13 from scratching the first side wall 122 of the sealing element 12 during assembly.

In some embodiments, the top cover assembly 10 further includes a second connecting part. The second connecting part is configured to connect the first side wall 122 of the sealing element 12 and the second side wall 132 of the fixing element 13.

The setting of the second connecting part is beneficial to firmer connection between the sealing element 12 and the fixing element 13. After the fixing element 13 is connected with the cover plate body 11, it is beneficial to firmer connection between the sealing element 12 and the mounting part 14. Wherein the fixing element 13 can be directly connected with the cover plate body 11, and can also be connected with the cover plate body 11 through the mounting part 14.

In some embodiments, the second connecting part includes a second connecting convex part and a second connecting concave part. The second connecting convex part is arranged in one of the first side wall 122 and the second side wall 132. The second connecting concave part is arranged in the other of the first side wall 122 and the second side wall 132. The second connecting convex part is configured to be connected with the second connecting concave part.

In some embodiments, the shape of the second connecting convex part is matched with the shape of the second connecting concave part.

For example, the second connecting convex part may be a second convex ring arranged on one of the first side wall 122 or the second side wall 132, and the second connecting concave part may include a second concave ring which is shape-matched with the second convex ring and arranged on the other of the first side wall 122 or the second side wall 132. Wherein the number of the second convex ring may be one or more, and the number of the second concave ring is the same as the number of the second convex ring.

For another example, the second connecting convex part may include a second protruding block arranged on one of the first side wall 122 or the second side wall 132, and the second connecting concave part may include a second notch or a second opening which is shape-matched with the second protruding block and arranged on the other of the first side wall 122 or the second side wall 132. Wherein the number of second protruding block may be one or more, and the number of the second notch or the second opening is the same as the number of second protruding block.

The battery of the embodiment of the present disclosure includes the aforementioned top cover assembly 10, therefore, the battery has corresponding advantages of the aforementioned top cover assembly 10.

A more detailed description will be given below on the top cover assembly 10 for a battery of the embodiment of the present disclosure in combination with FIG. 2 to FIG. 15.

As shown in FIG. 2 to FIG. 4, the top cover assembly 10 includes a cover plate body 11, a liquid injection hole sealing structure, a pole column 15 and an explosion-proof valve 16.

Figure 5:
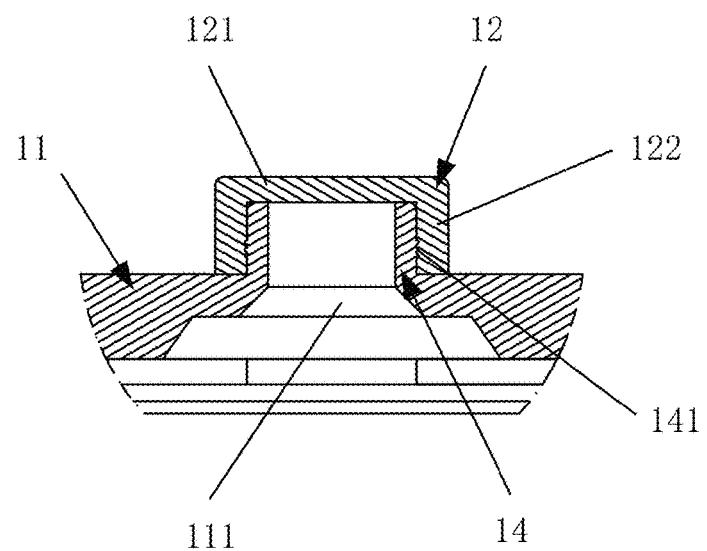
FIG. 5 is a schematic diagram of an enlarged structure of part B in FIG. 4.

The cover plate body 11 is provided with a liquid injection hole 111. The liquid injection hole sealing structure is arranged on the cover plate body 11, and is configured to seal the liquid injection hole 111. As shown in FIG. 4 and FIG. 5, the liquid injection hole sealing structure includes a mounting part 14 and a sealing element 12.

The mounting part 14 is arranged around the liquid injection hole 111 to form a hollow column with an axial through hole. The axial through hole of the mounting part 14 is coaxial and communicated with the liquid injection hole 111. The mounting part 14 is arranged on the cover plate body 11, and the connection between the mounting part 14 and the cover plate body 11 is a sealed connection to prevent the liquid injection hole 111 from leaking from the connecting portion.

As shown in FIG. 4 and FIG. 5, the sealing element 12 is connected to the mounting part 14. The sealing element 12 is shaped like a sealing cap in the present embodiment, and is covered on the mounting part 14. The sealing element 12 includes a first top wall 121 and a first side wall 122 extending from the outer periphery of the first top wall 121. The first top wall 121 is covered above the axial through hole of the mounting part 14 to cover the liquid injection hole 111. As shown in FIG. 5, the inner peripheral surface of the first side wall 122 is in press fit with the outer peripheral surface of the mounting part 14, to achieve sealing on the liquid injection hole 111.

As shown in FIG. 5, the mounting part 14 is shaped like a straight cylinder, and an anti-release part is arranged on the outer peripheral surface of the mounting part 14. The anti-release part includes a plurality of bumps 141. The plurality of bumps 141 are evenly distributed around the outer peripheral surface of the mounting part 14. The plurality of bumps 141 are beneficial to preventing the sealing element 12 from separating from the mounting part 14 and are beneficial to ensuring the sealing effect on the liquid injection hole 111.

As shown in FIG. 5, the lower surface of the first top wall 121 is also in press fit with the top surface of the mounting part 14, to enhance the sealing ability of the sealing element 12 on the liquid injection hole 111.

In some embodiments, the mounting part 14 may be integrally formed with the cover plate body 11. In the present embodiment, the cover plate body 11, the mounting part 14 and the liquid injection hole 111 are formed by stamping with a mould, and the lower part of the liquid injection hole 111 of the cover plate body 11 is set in the form of a counterbore, to facilitate the formation of the mounting part 14 through extrusion. The mounting part 14 protrudes upwards and is higher than the top surface of the cover plate body 11.

In some other embodiments, the mounting part 14 may also be assembled and connected to the cover plate body 11 after they are separately manufactured, for example, the mounting part 14 may be assembled and connected to the cover plate body 11 by means of welding, screwing, clamping, etc.

In the present embodiment, the sealing element 12 is made of an elastic material. In some embodiments, the sealing element 12 may be manufactured of fluororubber or ethylene-propylene rubber that are resistant to electrolyte. The use of an elastic material to manufacture the sealing element 12 is beneficial to a close fit between the sealing element 12 and the mating surface of the mounting part 14, and is further beneficial to improving the sealing performance of the sealing element 12 on the liquid injection hole 111.

The diameter of the inner peripheral surface of the first side wall 112 of the sealing element 12 is smaller than the diameter of the outer peripheral surface of the first mounting surface 14A of the mounting part 14 in a natural state. After the sealing element 12 and the mounting part 14 are assembled, the inner peripheral surface of the first side wall 112 of the sealing element 12 can be pressed against the outer peripheral surface of the mounting part 14. After the sealing element 12 and the mounting part 14 are assembled, the bottom surface of the first top wall 121 is in press fit with the top surface of the mounting part 14.

In the present embodiment, a sealing interface is formed between the first top wall 121 and the top surface of the mounting part 14, a sealing interface is formed between the first side wall 122 and the outer peripheral surface of the mounting part 14, therefore, the sealing effect on the liquid injection hole 111 is favorable.

FIG. 6 to FIG. 10 show an alternative embodiment of a top cover assembly 10 of the embodiment shown in FIG. 3 to FIG. 5.

As shown in FIG. 6 to FIG. 10, the liquid injection hole sealing structure includes a mounting part 14, a sealing element 12 and a fixing element 13. The outer peripheral surface of the mounting part 14 is a step surface. The sealing element 12 is shaped like a sealing cap, and includes a first top wall 121 and a first side wall 122 extending along the periphery of the first top wall 121. The fixing element 13 is shaped like a cap in the present embodiment, and includes a second top wall 131 and a second side wall 132 extending along the periphery of the second top wall 131. The fixing element 13 covers the outer side of the sealing element 12, and is configured to fix the sealing element 12 on the mounting part 14 through fixed connection with the cover plate body 11. In the embodiment shown in FIG. 6 to FIG. 10, the fixing element 13 achieves fixed connection with the cover plate body 11 through fixed connection with the mounting part 14.

Figure 6:
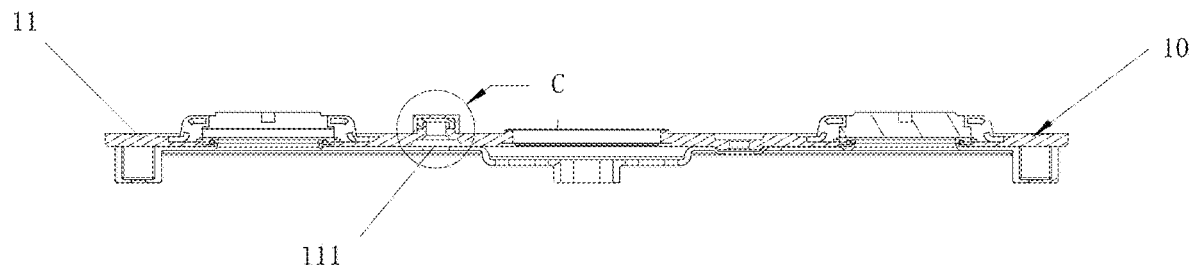
FIG. 6 is a structural schematic diagram of a sectional view of a top cover assembly of a battery in another embodiment.
Figure 7:
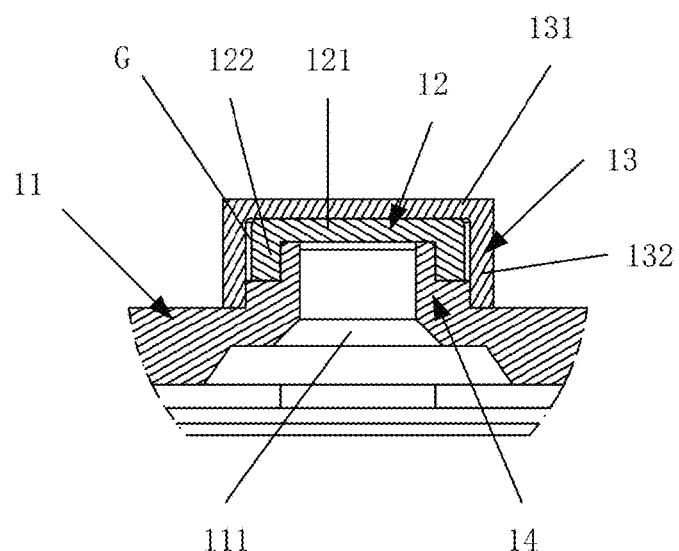
FIG. 7 is a schematic diagram of an enlarged structure of part C in FIG. 6.

As shown in FIG. 6 and FIG. 7, the second top wall 131 of the fixing element 13 is in press fit with the first top wall 121 of the sealing element 12, such that the first top wall 121 is reliably pressed against the mounting part 14.

As shown in FIG. 7, a gap G exists between the second side wall 132 of the fixing element 13 and the first side wall 122 of the sealing element 12. The gap G is beneficial to the mounting of the fixing element 13 in place, which is beneficial to achieving press fit between the second top wall 131 of the fixing element 13 and the first top wall 121 of the sealing element 12. The gap G is also beneficial to avoiding affecting the sealing performance or service life of the sealing element 12 due to the fixing element 13 scratching the first side wall 122 of the sealing element 12 during the assembly process.

Figure 8:
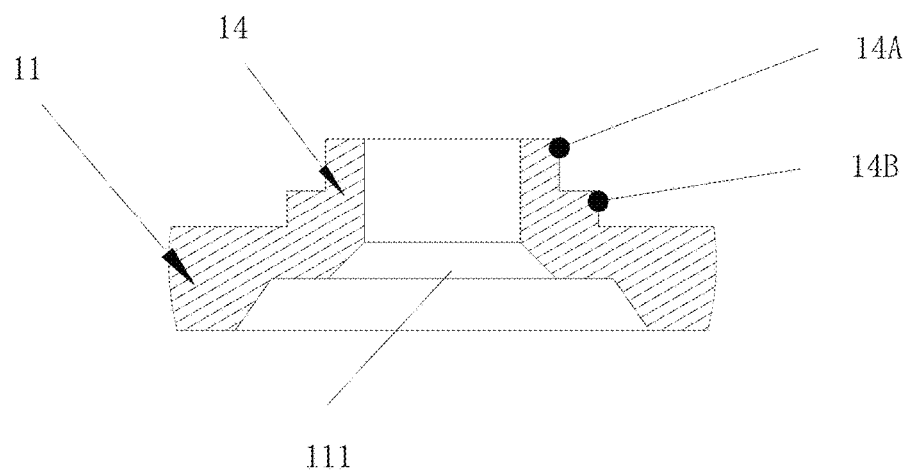
FIG. 8 is a structural schematic diagram of a partial sectional view of a cover plate body of a top cover assembly in the embodiment shown in FIG. 6 in a liquid injection hole.

As shown in FIG. 6 to FIG. 8, the outer peripheral surface of the mounting part 14 includes a first mounting surface 14A and a second mounting surface 14B arranged below the first mounting surface 14A. The diameter of the second mounting surface 14B is greater than the diameter of the first mounting surface 14A. The inner peripheral surface of the first side wall 122 of the sealing element 12 is in press fit with the first mounting surface 14A. The second side wall 132 of the fixing element 13 is fixedly connected with the second mounting surface 14B.

In the present embodiment, the cover plate body 11, the mounting part 14, and the liquid injection hole 111 are formed by stamping with a mould. The outer peripheral surface of the mounting part 14 forms a step surface, wherein the radius difference between the second mounting surface 14B and the first mounting surface 14A is greater than the thickness of the first side wall 122 of the sealing element 12 to form a gap G.

The diameter of the inner peripheral surface of the first side wall 112 of the sealing element 12 is smaller than the diameter of the outer peripheral surface of the first mounting surface 14A of the mounting part 14 in a natural state. After the sealing element 12 is assembled with the mounting part 14, the inner peripheral surface of the first side wall 112 of the sealing element 12 can be pressed against the outer peripheral surface of the mounting part 14.

The fixing element 13 and the mounting part 14 can be fixedly connected by interference fit. At this time, the second side wall 132 of the fixing element 13 is pressed to make an interference fit between the inner peripheral surface of the second side wall 132 and the second mounting surface 14B of the mounting part 14, so that the fixing element 13 and the mounting part 14 are fixedly connected.

The fixing element 13 may be made of a metal material, for example, the fixing element 13 may be made of a metal material with high strength and good ductility, such as aluminum. The wall thickness of the fixing element 13 can be selected according to the requirements of the structure and material of the fixing element 13, and the connection method with the cover plate body 11. For example, the fixing element 13 of the present embodiment is made of aluminum material, and the wall thickness can be 0.2 mm to 0.6 mm.

In some embodiments, the fixed connection between the fixing element 13 and the mounting part 14 may be achieved through threaded connection. At this time, the inner peripheral surface of the second side wall 132 is provided with a female thread, and the second mounting surface 14B of the mounting part 14 is provided with a male thread matching the female thread. During assembly, the fixing element 13 is screwed on the second mounting surface 14B of the mounting part 14, to achieve fixed connection between the fixing element 13 and the mounting part 14.

In some embodiments, such manners like clamping can be adopted to achieve fixed connection between the fixing element 13 and the mounting part 14.

During the production process, when the battery with the top cover assembly 10 of the present embodiment is first filled, the electrolyte is filled into the accommodating cavity of the battery through the liquid injection hole 111. After the electrolyte is filled, the sealing element 12 and the fixing element 13 are sequentially sleeved on the mounting part 14.

The diameter of the inner peripheral surface of the first side wall 122 of the sealing element 12 is smaller than the diameter of the first mounting surface 14A of the mounting part 14. The first side wall 122 is stretched when the sealing element 12 and the mounting part 14 are assembled. After assembly, the inner peripheral surface of the first side wall 122 forms pressure on the first mounting surface 14A to achieve sealing between the first side wall 122 of the sealing element 12 and the mounting part 14.

After the sealing element 12 is assembled with the mounting part 14, the bottom surface of the first top wall 121 is in press fit with the top surface of the mounting part 14. After the fixing element 13 is assembled with the mounting part 14 and the sealing element 12, a pressure is applied to an upper surface of the first top wall 121 of the sealing element 12, the first top wall 121 of the sealing element 12 is pressed towards the top surface of the mounting part 14, to achieve sealing between the first top wall 121 and the mounting part 14.

In the present embodiment, a sealing interface is formed between the first top wall 121 and the top surface of the mounting part 14, and a sealing interface is formed between the first side wall 122 and the outer peripheral surface of the mounting part 14, therefore, the sealing effect on the liquid injection hole 111 is favorable.

When the battery is refilled, a tool is used to clamp and remove the fixing element 13, and then the sealing element 12 is removed to expose the liquid injection hole 111 to refill the battery. After the refilling is completed, the new sealing element 12 and the fixing element 13 are assembled to the mounting part 14 to realize resealing of the liquid injection hole 111, and the battery can be restored to use.

In the present embodiment, the mounting part 14 protrudes upwards relative to the top surface of the cover plate body 11, such that the sealing interface between the sealing element 12 and the mounting part 14 is higher than the top surface of the cover plate body 11. The deformation of the cover plate body 11 has a small influence on the mounting part 14, which is beneficial to reducing the influence of the deformation of the cover plate body 11 on the sealing effect.

In the embodiments of the present disclosure, the liquid injection hole sealing structure of the top cover assembly 10 is simple, easy to manufacture, and has a small structural size. The connection of components of the liquid injection hole sealing structure is simple, and the disassembly and assembly of components are convenient, and repeated opening and closing of the liquid injection hole 111 can be realized, which is beneficial to realizing refilling when the battery is used, and the stability of the sealing performance of the liquid injection hole 111 before and after refilling can be realized, and the appearance of the battery before and after refilling can be maintained.

For the parts not illustrated in the embodiment shown in FIG. 6 to FIG. 10, please refer to the related contents of the aforementioned embodiments.

FIG. 11 shows an alternative embodiment of the top cover assembly 10 in the embodiments shown in FIG. 6 to FIG. 10. As shown in FIG. 11, the embodiment differs from the embodiments shown in FIG. 6 to FIG. 10 in that the top cover assembly 10 further includes a second connecting part. Wherein the second connecting part includes a second connecting convex part and a second connecting concave part which are mutually matched.

As shown in FIG. 11, in the present embodiment, the second connecting convex part includes a second convex ring 12A. The second convex ring 12A is arranged on the outer peripheral surface of the first side wall 122 of the sealing element 12. The second connecting concave part includes a second concave ring that is shape-matched with the second convex ring 12A, and the second concave ring is arranged on the inner peripheral surface of the second side wall 132 of the fixing element 13.

After the fixing element 13 is connected with the cover plate body 11 through a mounting part 14, the second convex ring 12A is shape-matched with the first concave ring, which is beneficial to firmer connection between the sealing element 12 and the mounting part 14.

For the parts not illustrated in the embodiment shown in FIG. 11, please refer to the related contents of the aforementioned embodiments.

Figure 12:
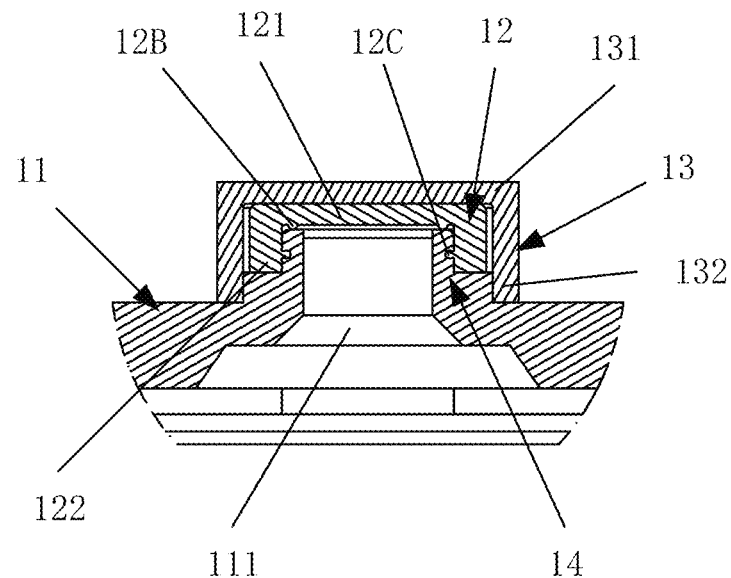
FIG. 12 is a structural schematic diagram of a partial sectional view of a top cover assembly in another embodiment in the liquid injection hole.

FIG. 12 shows another alternative embodiment of a top cover assembly 10 in the embodiments shown in FIG. 6 to FIG. 10.

As shown in FIG. 12, the embodiment differs from the embodiments shown in FIG. 6 to FIG. 10 in that the first top wall 121 is provided with a sealing ring 12B protruding towards the mounting part 14, and the sealing ring 12B is used for press fit with the mounting part 14.

The sealing ring 12B is more likely to realize full circumferential contact with the mounting part 14 in the circumferential direction compared with the remaining parts of the first top wall 121, thereby being beneficial to improving sealing performance between the first top wall 121 and the mounting part 14.

In the present embodiment, the cross section of the sealing ring 12B is semi-circular, and in the embodiments not shown in the figures, the cross section of the sealing ring may also be rectangular, trapezoidal, triangular, and may be in other shapes.

In the present embodiment, the first top wall 121 is provided with a sealing ring 12B. In an embodiment not shown in the figure, the number of the sealing rings may be two or more.

As shown in FIG. 12, another difference between the present embodiment and the embodiments shown in FIGS. 6 to 10 lies in that the top cover assembly 10 includes a first connecting part, and the first connecting part includes a first connecting convex part and a first connecting concave part. The first connecting convex part is a first convex ring 12C arranged on the first side wall 122 of the sealing element 12, and the first connecting concave part includes a first concave ring that is shape-matched with the first convex ring 12C and arranged on the mounting part 14.

For the parts not illustrated in the embodiment shown in FIG. 12, please refer to the related contents of the aforementioned embodiments.

Figure 13:
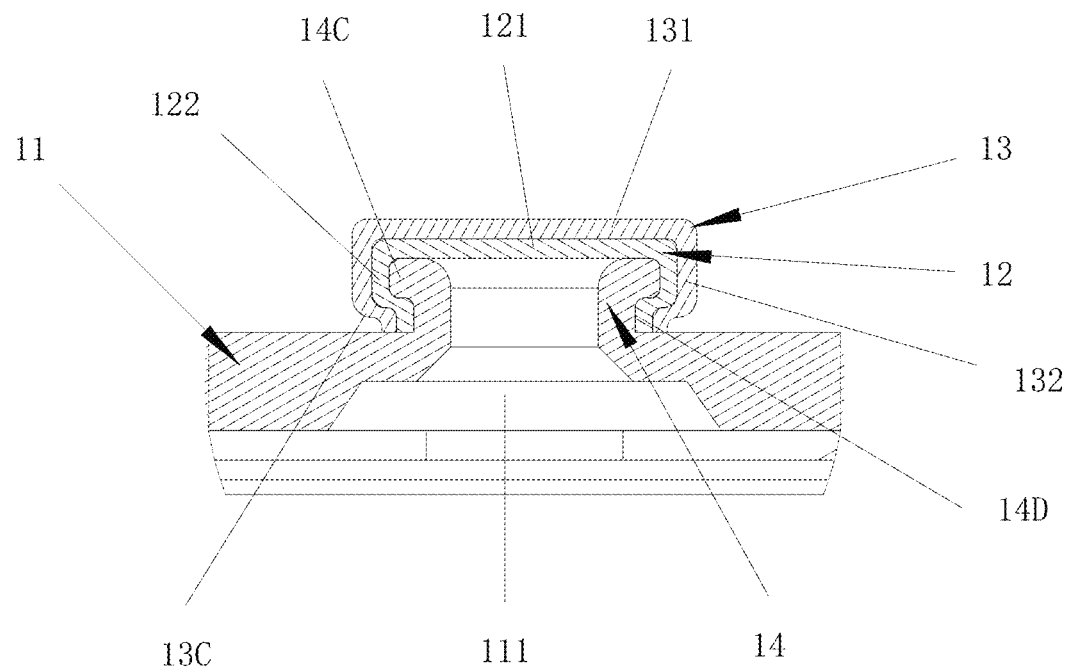
FIG. 13 is a structural schematic diagram of a partial sectional view of a top cover assembly in another embodiment in the liquid injection hole.

FIG. 13 shows an alternative embodiment of the top cover assembly 10 of the embodiments shown in FIG. 6 to FIG. 10. As shown in FIG. 13, the present embodiment differs from the embodiments shown in FIG. 6 to FIG. 10 in that the outer peripheral surface of the mounting part 14 is provided with a recessed part 14D which is inwardly recessed, and the recessed part 14D is configured to accommodate part of the first side wall 122 of the sealing element 12. The setting is beneficial to firm fixation between the sealing element 12 and the mounting part 14, is beneficial to preventing the sealing element 12 from being separated from the mounting part 14, and is further beneficial to ensuring the sealing effect on the liquid injection hole 111.

As shown in FIG. 13, in the present embodiment, the upper part of the mounting part 14 is formed with an annular flange 14C protruding outwards in the radial direction relative to the lower part, and the aforementioned recessed part 14D which is inwardly recessed is formed between the bottom surface of the annular flange 14C and the top surface of the cover plate body 11, and the recessed part 14D is annular.

In the present embodiment, the first side wall 122 of the sealing element 12 and the second side wall 132 of the fixing element 13 are both cylindrical before assembly. During assembly, the sealing element 12 is first sleeved on the top of the mounting part 14, and then the fixing element 13 is sleeved on the outside of the sealing element 12, and then the bottom of the second side wall 132 of the fixing element 13 is pressed towards the recessed part 14D, the second side wall 132 is permanently deformed to press the first side wall 122 of the sealing element 12 against the wall surface of the recessed part 14D, thereby fixing both the sealing element 12 and the fixing element 13 to the mounting part 14.

In the process of producing the battery with the top cover assembly 10 of the present embodiment, during the initial filling, the electrolyte is filled into the accommodating cavity of the battery through the liquid injection hole 111. After the electrolyte is filled, the sealing element 12 and the fixing element 13 are sequentially sleeved on the mounting part 14, and a closing device is used to exert an acting force on the outer peripheral surface of the lower part of the second side wall 132 of the fixing element 13, so that the fixing element 13 is gradually contracted. The lower part of the second side wall 132 of the fixing element 13 compresses the lower part of the first side wall 122 of the sealing element 12, so that the lower part of the first side wall 122 is abutted and pressed against the recessed part 14D of the mounting part 14. During the inward contraction process of the lower part of the second side wall 132 of the fixing element 13, the fixing element 13 translates and deforms downwards as a whole, and the space between the top surface of the mounting part 14 and the second top wall 131 of the fixing element 13 is reduced, the second top wall 131 of the fixing element 13 compresses the first top wall 121 of the sealing element 12, thereby enhancing the sealing performance of the second sealing interface between the first top wall 121 of the sealing element 12 and the fixing element 13. As shown in FIG. 13, after the assembly is completed, the bottom of the second side wall 132 of the fixing element 13 forms an inwardly recessed part 13C.

When the battery is refilled, a tool is used to remove the fixing element 13, and the mounting part 14 is protected from deformation, and the sealing element 12 is removed to expose the liquid injection hole 111 to refill the battery. After the refilling is completed, the new sealing element 12 and the fixing element 13 are assembled to reseal the liquid injection hole 111, and the battery can be restored to use.

In the present embodiment, the structure of the recessed part 14D and the connection manner between the fixing element and the mounting part 14 is beneficial to ensuring that the sealing element 12 and the fixing element 13 do not separate from the mounting part 14 due to vibration, shock and the like of the electrode assembly, thereby being beneficial to ensuring the sealing performance on the liquid injection hole 111.

In some embodiments, the sealing element 12 and the fixing element 13 may not appear as a single body, but form a combined element. For example, the sealing element 12 is attached to the inside of the fixing element 13 in the form of a coating, such that the sealing element 12 and the fixing element 13 form a combined element. The thickness of the coating may be for example 0.1 mm to 0.4 mm. When the liquid injection hole 111 is sealed, the combined element is assembled on the mounting part 14, and then the combined element is closed and sealed. The fitting degree of the sealing element 12 and the fixing element 13 in the combined element is higher, which is beneficial to alleviating the problem of decrease of the connection firmness caused by the air gap that may exist between the sealing element 12 and the fixing element 13 during the assembly process. At the same time, forming the sealing element 12 and the fixing element 13 into a combined element can reduce the number of parts and make the assembly simpler and more reliable.

In the embodiments not shown in the figures, the recessed part can also include a plurality of notches.

For the parts not illustrated in the embodiment shown in FIG. 13, please refer to the related contents of the aforementioned embodiments.

Figure 14:
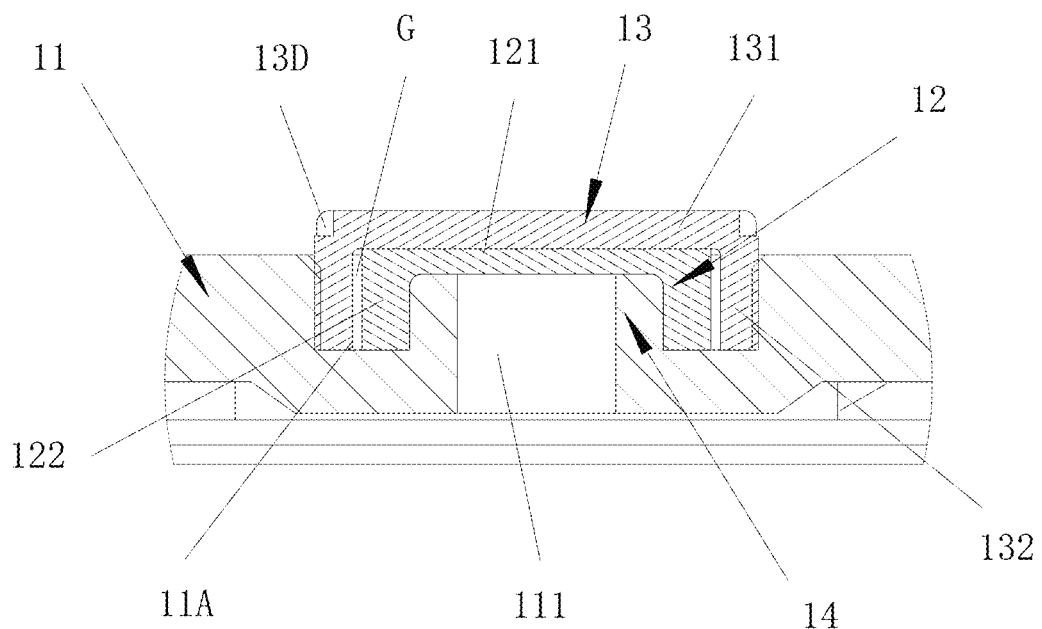
FIG. 14 is a structural schematic diagram of a partial sectional view of a top cover assembly in another embodiment in the liquid injection hole.
Figure 15:
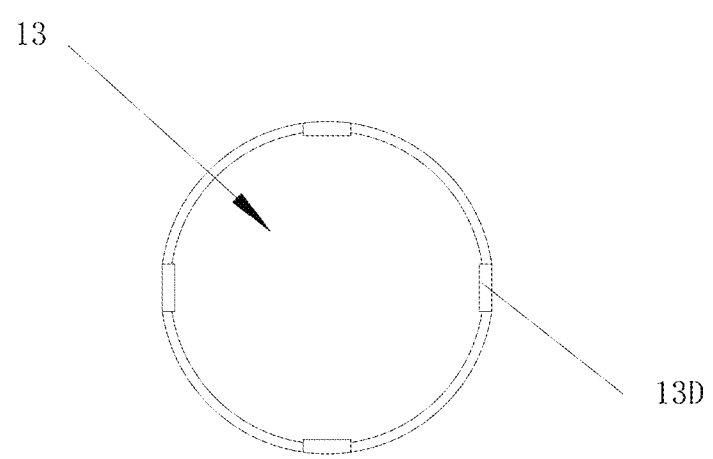
FIG. 15 is structural schematic diagram of a top view of a fixing element of a top cover assembly in the embodiment shown in FIG. 14.

FIG. 14 and FIG. 15 show an alternative embodiment of the top cover assembly 10 of the embodiments shown in FIG. 6 to FIG. 10. As shown in FIG. 14 and FIG. 15, the present embodiment mainly differs from the embodiments shown in FIG. 6 to FIG. 10 in that the cover plate body 11 is provided with a groove, the groove is configured to accommodate at least part of the sealing element 12, and the mounting part 14 is connected to the bottom wall of the groove.

The setting of a groove on the cover plate body 11 is beneficial to reducing the space above the top surface of the cover plate body 11 occupied upwards by the mounting part 14 and the sealing element 12, and is also beneficial to preventing an external force from influencing connection firmness between the sealing element 12 and the mounting part 14, thereby being beneficial to preventing the sealing element 12 from separating from the mounting part 14, and further being beneficial to ensuring sealing effect on the liquid injection hole 111.

As shown in FIG. 14, in the present embodiment, the mounting part 14 is arranged in the groove of the cover plate body 11. The outer peripheral surface of the mounting part 14 and the side wall of the groove of the cover plate body 11 form an annular cavity 11A, the first side wall 122 of the sealing element 12 and the second side wall 132 of the fixing element 13 are arranged in the annular cavity 11A. Wherein the second side wall 132 of the fixing element 13 is fixedly connected to the side wall of the groove of the cover plate body 11.

As shown in FIG. 14, in the present embodiment, the outer peripheral surface of the second side wall 132 of the fixing element 13 is provided with a male thread, and the side wall of the groove of the cover plate body 11 has a female thread that cooperates with the male thread. When the fixing element 13 and the cover plate body 11 are assembled, the fixing element 13 needs to be screwed into the groove of the cover plate body 11.

As shown in FIG. 14 and FIG. 15, in order to screw the fixing element 13, the fixing element 13 is further provided with a clamping part for cooperating with a screwing tool. In the present embodiment, the clamping part includes a plurality of notches 13D arranged at the connecting portion between the second top wall 131 and the second side wall 132.

In some embodiments not shown in the figures, the fixed connection between the fixing element 13 and the cover main body 11 can be realized through interference fit between the second side wall 132 of the fixing element 13 and the side wall of the groove of the cover plate body 11. At this time, the aforementioned clamping part of the fixing element 13 is not necessary.

For the part not illustrated in the embodiments shown in FIG. 14 and FIG. 15, please refer to related contents of the aforementioned embodiments.

Finally, it should be noted that the above embodiments are merely used to illustrate rather than limiting the technical solutions of the present disclosure; although the present disclosure has been described in detail with reference to preferred embodiments, those skilled in the art should understand that the specific implementations of the present disclosure can still be modified or some technical features can be equivalently substituted, and such modifications or equivalent substitutions should all fall within the scope of the technical solutions claimed in the present disclosure.

The invention claimed is:

1. A top cover assembly for a battery, comprising:
a cover plate body having a liquid injection hole;
a mounting part configured to be connected with the cover plate body and arranged around the liquid injection hole;
a sealing element configured to be connected with the mounting part and comprising a first top wall and a first side wall connected to a periphery of the first top wall, wherein the first side wall is sleeved on an outer periphery of the mounting part, the first top wall is configured to cover the liquid injection hole, and the first side wall is configured to be in press fit with the mounting part to achieve sealing of the liquid injection hole;
a fixing element configured to be connected with the cover plate body and fix the sealing element to the mounting part, wherein the fixing element comprises a second top wall and a second side wall connected to an outer periphery of the second top wall, the second side wall is sleeved on an outer periphery of the first side wall, the second top wall is in press fit with the first top wall to fix the sealing element, and a gap is formed between at least part of the first side wall and at least part of the second side wall; and
a second connecting part configured to connect the first side wall and the second side wall, and comprising:
a second connecting convex part arranged in one of the first side wall and the second side wall; and
a second connecting concave part arranged in an other of the first side wall and the second side wall,
wherein the second connecting convex part is configured to be connected with the second connecting concave part.

2. The top cover assembly of claim 1, wherein an outer peripheral surface of the mounting part is provided with a recessed part which is inwardly recessed, and the recessed part is configured to accommodate part of the first side wall.

3. The top cover assembly of claim 1, wherein the cover plate body is provided with a groove, the groove is configured to accommodate at least part of the sealing element, and the mounting part is connected to a bottom wall of the groove.

4. The top cover assembly of claim 1, wherein an anti-release part is arranged between an inner peripheral surface of the first side wall and an outer peripheral surface of the mounting part, and the anti-release part is configured to prevent the sealing element from separating from the mounting part.

5. The top cover assembly of claim 4, wherein the anti-release part comprises a bump or a rough area, and the bump or the rough area is arranged on at least one of the inner peripheral surface of the first side wall and the outer peripheral surface of the mounting part.

6. The top cover assembly of claim 1, wherein the top cover assembly further comprises a first connecting part, and the first connecting part is configured to connect the first side wall and the mounting part.

7. The top cover assembly of claim 6, wherein the first connecting part comprises:
   a first connecting convex part, arranged in one of the first side wall and the mounting part; and
   a first connecting concave part, arranged in an other of the first side wall and the mounting part;
   wherein the first connecting convex part is configured to be connected with the first connecting concave part.

8. The top cover assembly of claim 1, wherein the first top wall is in press fit with the mounting part, to achieve a sealed connection between the sealing element and the mounting part.

9. The top cover assembly of claim 8, wherein the first top wall is provided with a sealing ring protruding towards the mounting part, and the sealing ring is configured to be in press fit with the mounting part.

10. A battery, comprising:
    the top cover assembly of claim 1;
    a housing configured to be connected with the top cover assembly and form an accommodating cavity; and
    an electrode assembly, arranged in the accommodating cavity.

11. A device using a battery as a power source, comprising the battery of claim 10, wherein the battery is configured to provide electric energy.

* * * * *